J. H. DEAN.
VOTING MACHINE.
APPLICATION FILED JUNE 20, 1910.

1,158,647.

Patented Nov. 2, 1915.
10 SHEETS—SHEET 9.

WITNESSES
Ottilie C Freiberg
Eleanor Hagensi.

INVENTOR
James H. Dean
BY
Peirce & Fisher
ATTORNEYS.

UNITED STATES PATENT OFFICE.

JAMES H. DEAN, OF CHICAGO, ILLINOIS, ASSIGNOR, BY MESNE ASSIGNMENTS, TO EMPIRE VOTING MACHINE COMPANY, A CORPORATION OF NEW YORK.

VOTING-MACHINE.

1,158,647.  Specification of Letters Patent.  Patented Nov. 2, 1915.

Application filed June 20, 1910. Serial No. 568,009.

*To all whom it may concern:*

Be it known that I, JAMES H. DEAN, a citizen of the United States, residing at Chicago, in the county of Cook and State of Illinois, have invented certain new and useful Improvements in Voting-Machines, of which I do declare the following to be a full, clear, and exact description, reference being had to the accompanying drawings, forming part of this specification.

My present invention relates to improvements on that type of machine described more especially in my prior applications Nos. 238,388, 453,479, 453,480, now patents numbered 1,013,646, 995,331, and 1,036,464, respectively, and my renewed application No. 17,892, which applications are referred to herein and made a part hereof, in which machine the keys and counters are arranged in interchangeable unit sections having two keys and two counters in each section, the whole being contained in a machine body having a shape approximating a cube.

One feature of my invention consists in mounting this machine body so that it may be swung to either of several positions, one in which the key board of the machine is substantially horizontal, another in which the keyboard is tilted so as to bring the far side of the keyboard within more ready access of the voter and in another position the whole machine is inverted making the interior mechanism thereof more accessible to the officers or mechanics charged with the duty of setting the machine for the election. To secure these results the machine is mounted on trunnions carried on suitable standards which standards in turn are supported on a wheel base, all of which constitutes another feature of my invention.

Another feature of my invention is an improved lockout device by which certain classes of voters are restricted to voting on particular keys of the machine by keeping the balance of the keys locked against operation.

Another feature of my invention is an improved primary lockout which is easily adjusted for different combinations and by which a voter in a primary election is restricted to voting on one or more rows of keys by locking the remaining rows of keys against operation.

Another feature of my invention consists in making this primary lockout completely interchangeable in its adjustment and automatic in its action so that the releasing of one row of keys will lock the remaining rows of keys.

Another feature of my invention is to provide the primary lockout with a centering and locking device which keeps it from being improperly positioned during the operation of the machine.

All of these features of my invention will be hereinafter more fully described and the novel features thereof will be pointed out in the claims at the end of the specification.

In the accompanying drawings

Similar reference numerals in the several figures indicate similar parts.

Figure 1:
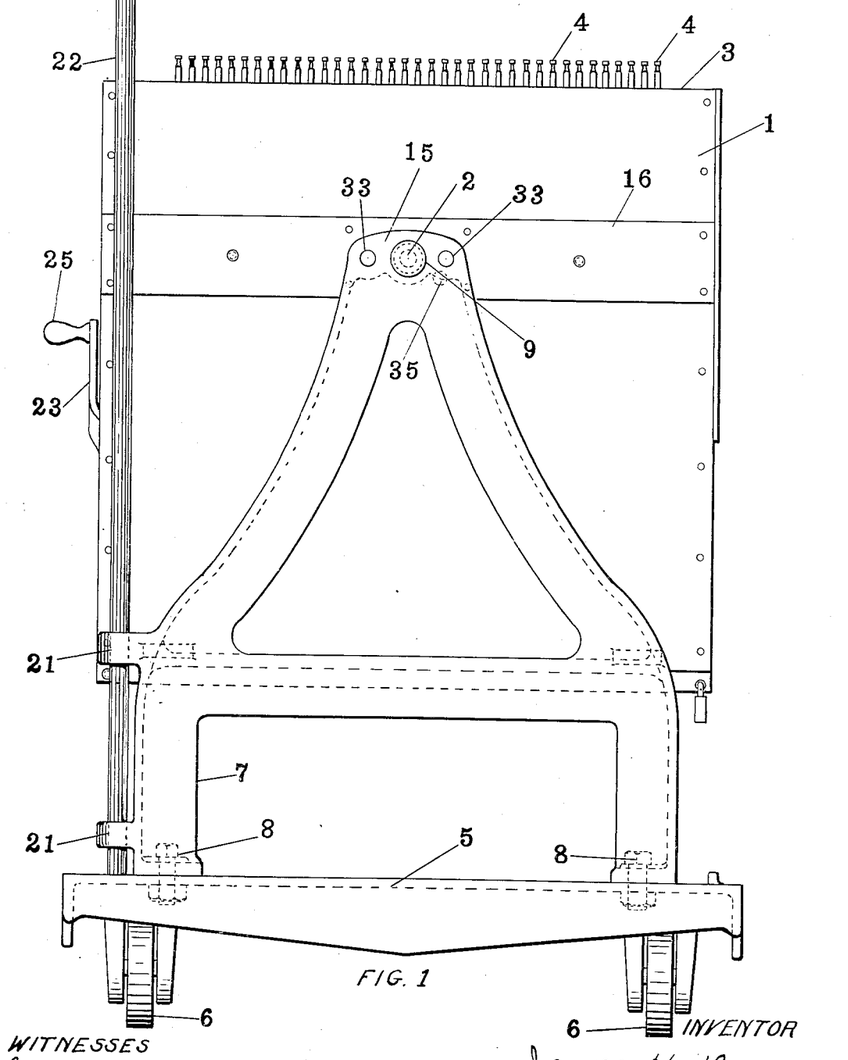
Figure 1 is a side elevation of the machine showing the trunnion mounting thereof and the wheel base therefor.
Figure 2:
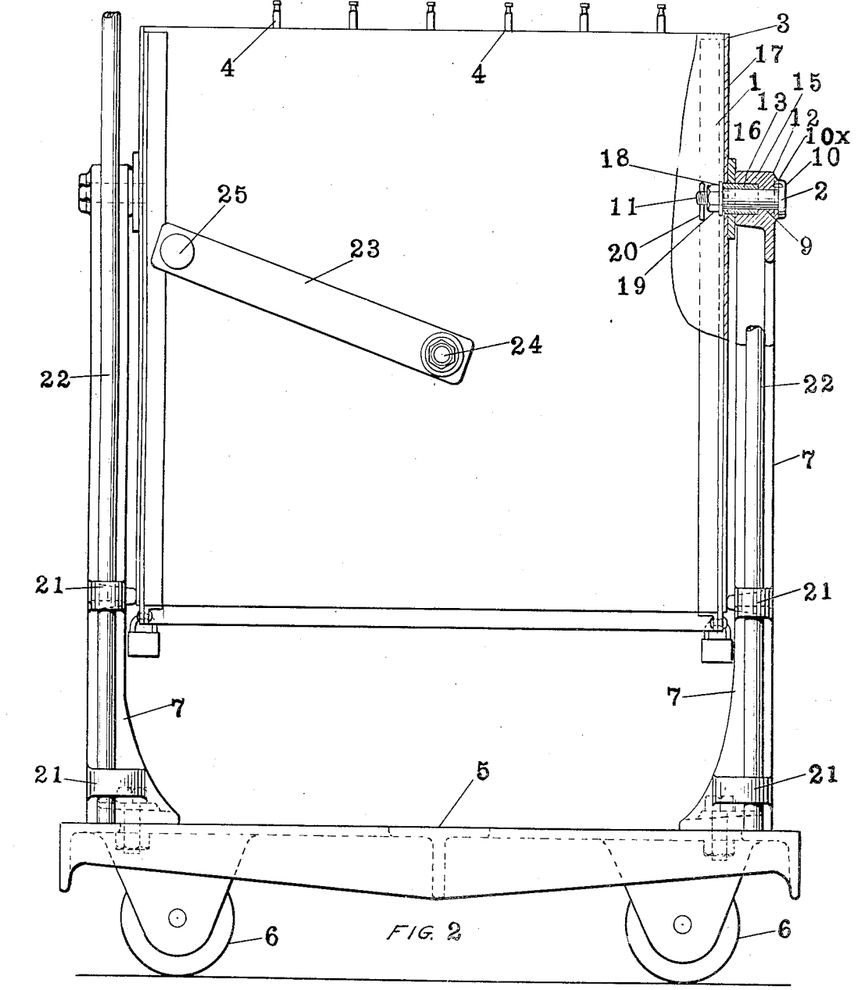
Fig. 2 is an end elevation of the machine showing the side from which the machine is operated by the voter.
Figure 3:
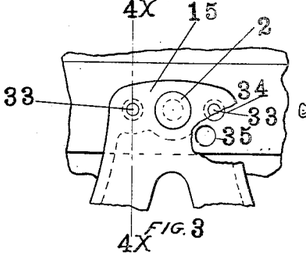
Fig. 3 is a detail view of the trunnion mounting of the machine.
Figure 4:
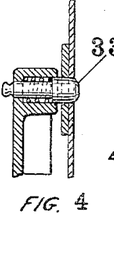
Fig. 4 is a section on the line 4×—4× of Fig. 3.

As indicated in Figs. 1 and 2 the machine comprises a body 1 mounted on trunnions 2 engaging the body at the sides thereof in the middle and above the center of gravity. On top of the machine is a key-plate 3 having keys 4—4 arranged thereon in rows, six rows, of keys being shown in end elevation in Fig. 2. The machine is carried on a base 5 mounted on rollers or wheels 6. Mounted on the base 5 are the uprights 7 which are fastened to the base 5 by the bolts 8. At the upper ends of these standards are the bearings 9 in which the trunnions 2 are carried. These trunnions have the form of a pin or bolt having a large head 10 at one end and a threaded end 11 at the other with an intermediate cylindrical part 12. A bushing 13 is used between the cylindrical part of the trunnion and the casing. Each of the uprights 7 has a round hole at the top thereof in which is carried the trunnion pin 2. The head 15 of each of the uprights is also partly bored out to the shape of a step-bearing to receive the bushing 13 through which the trunnion pin 2 passes. This bushing or collar 13 extends from the head 15 through the reinforcing plate 16 and the side 17 of the machine between which and the trunnion pin 2 it is free to turn. The trunnion pin 2 carries on its inner end a washer 18 and nut 19 both of which are securely held in place by the pin 20.

The machine is mounted on the trunnion by first supporting the body of the machine so that the hole through its casing is in line with the hole in the head of the upright, upon which the bushing 13 can be placed in position from the inside of the machine. After this the trunnion pin 2 can be inserted from the outside and fastened in place by the washer and nut from within the machine casing. Both trunnions are alike in this respect. The insertion of the pin 20 locks the nut 19 in position and completes the mounting of the machine on its bearings. A small pin $10^x$ is provided between the head 10 of the trunnion and the head 15 of the upright by which the trunnion pin is held against rotation.

The uprights 7 are provided with sockets 21—21 in which may be inserted the posts 22 by which the curtain forming the booth for the machine may be supported.

Mounted in the head 15 on either side of the trunnion pins are the spring pressed pins 33. Each of these pins is capable of engaging with the recesses 34 in the reinforcing strip 16 by which the machine is held in horizontal position. One of the pins can engage with the recess 35 by which the machine is held in the tilted position shown by the dotted lines in Fig. 6. If the machine is turned to the inverted position shown by full lines in Fig. 6 the pins 33 will each engage with the hole 34 in the reinforcing strip of the machine casing previously engaged by the other pin 33 and hold the machine in the inverted position.

Figure 5:
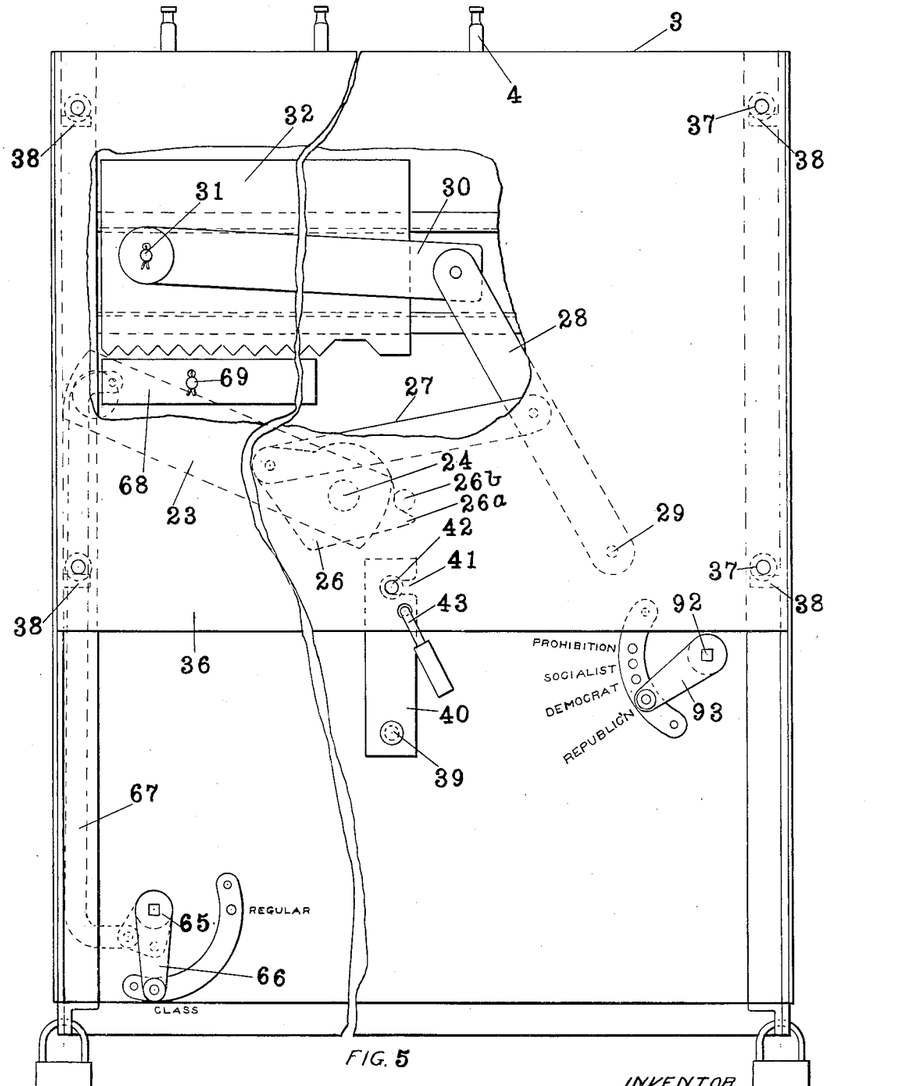
Fig. 5 is an elevation of the machine on the side opposite to that shown in Fig. 2 and on a larger scale, a section of the machine being shown broken away.
Figures 14, 15:
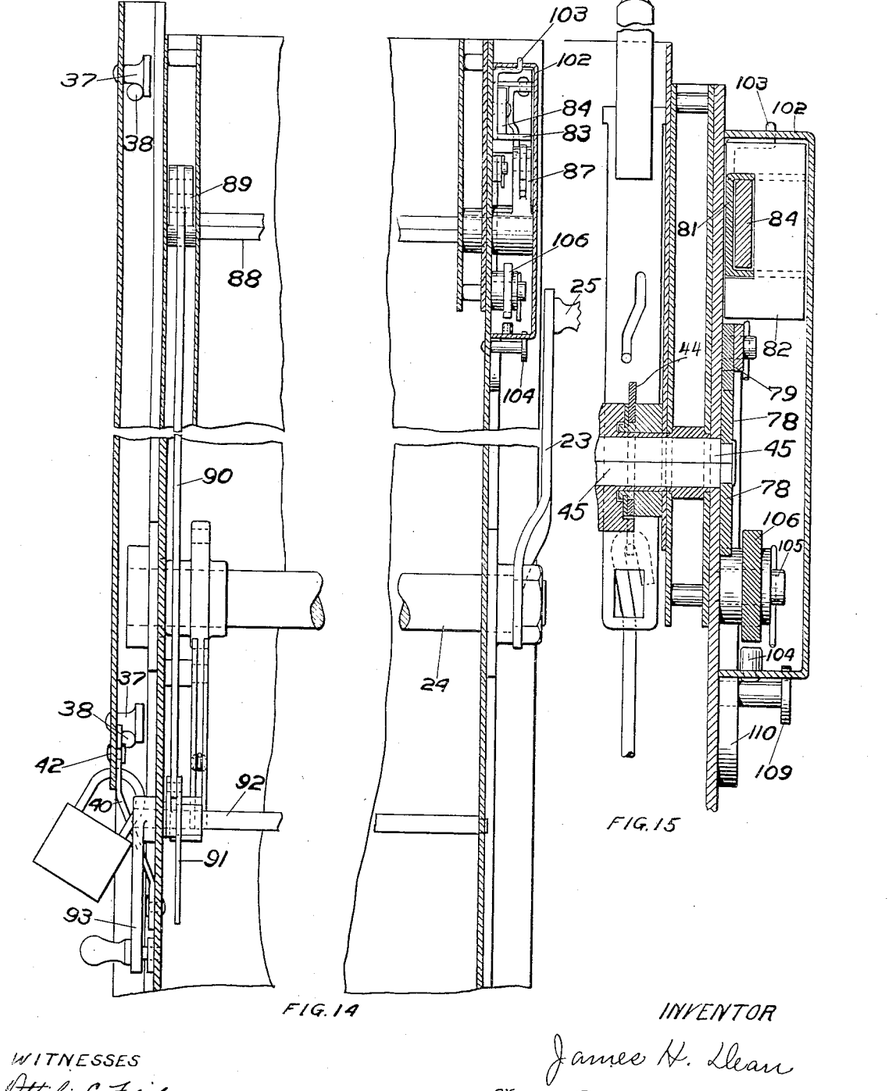
Fig. 14 is a section on the line 14×—14× of Fig. 9, showing the primary lockout lever and the parts operated thereby.
Fig. 15 is a section on the line 15×—15× of Fig. 9.

As shown in Fig. 14 the shaft 24 is mounted in the machine and extends from one end thereof to the other. This shaft extends through the casing at one end and has mounted thereon the operating lever 23 which lever is provided with a handle 25. Keyed to this shaft as is shown in Fig. 5 is the crank 26 to which in turn is pivoted the connecting rod 27 which in turn is pivoted to the lever 28 which lever is mounted to oscillate on the stud 29. Pivoted to the upper end of the lever 28 is the link 30 which in turn is pivoted to the stud 31 mounted on the sliding block 32. The oscillation of the lever 23 causes the reciprocation of the sliding block 32 and the operation of the machine incidental thereto. At one end of the crank 26 is a lug $26^a$ capable of contacting with the stud $26^b$ mounted on the machine casing to limit the movement of the operating lever in one direction. These parts normally are concealed by the plate 36 mounted on the end of the machine. This plate carries the studs 37 having large round heads, the heads of which studs engage with the pins 38—38 mounted in the sides of the machine casing. The engagement between the studs 37 and pins 38 is made by placing the plate 36 in proper position with the studs over the pins and giving it a downward movement. Mounted on the casing of the machine is the stud 39 on which is pivoted the latch 40. This latch is recessed at 41 where it can engage the stud 42 mounted on the casing of the machine. This latch 40 can be locked in the position shown in Fig. 5 by the padlock 43, the hasp of the padlock passing through the latch 40 and plate 36 both of which are perforated for the purpose.

Figure 8:
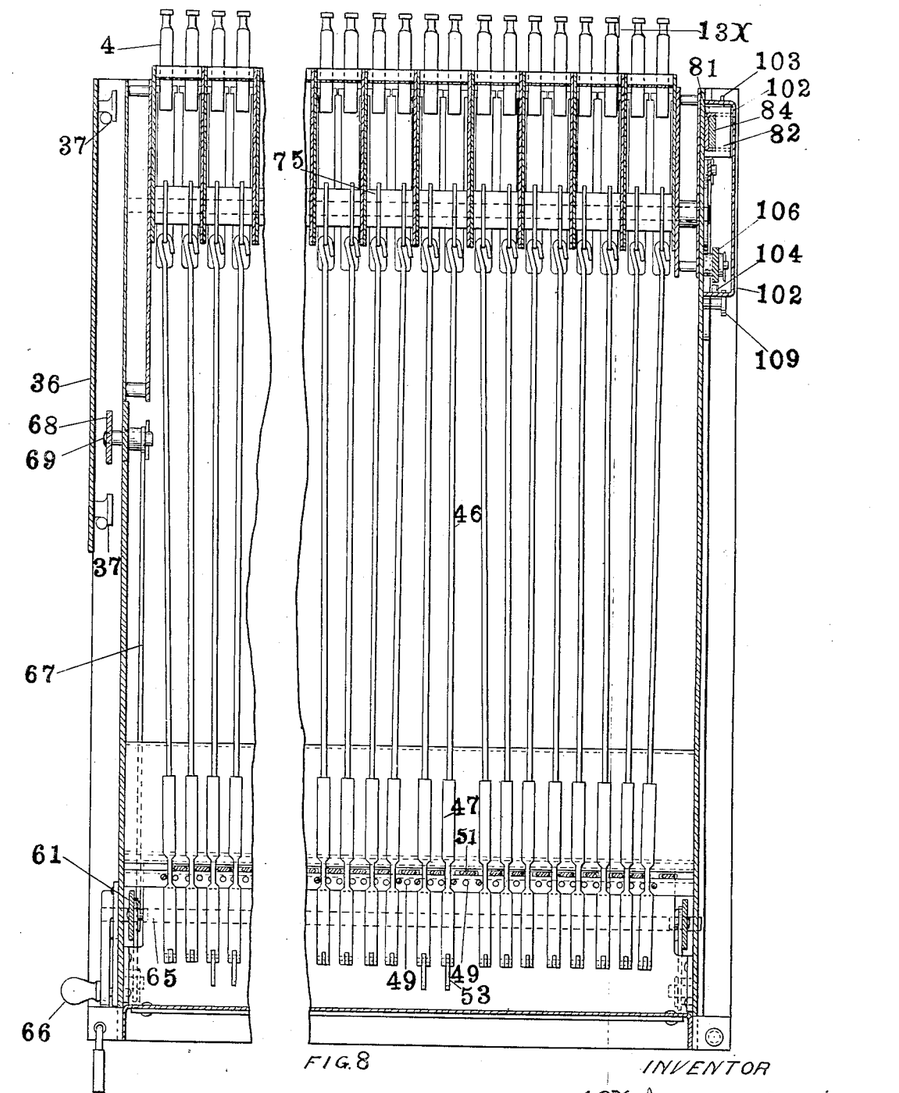
Fig. 8 is a section of the machine on the line 8×—8× of Fig. 13, a portion of the machine being shown broken away.
Figure 13:
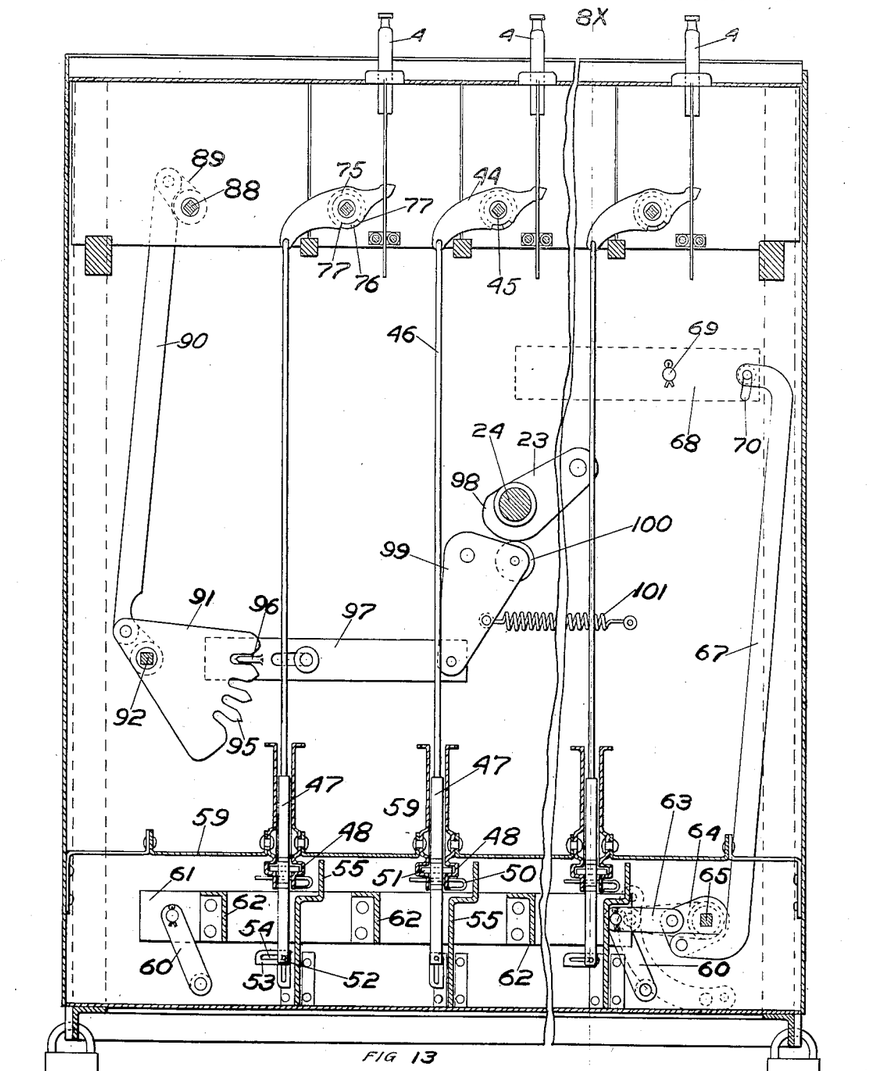
Fig. 13 is a section on the line 13×—13× of Fig. 8, showing the interlocking mechanism and the class lockout.

As shown in Fig. 13 each of the keys 4—4 is connected to a rocker arm 44 mounted to rotate around square shaft 45. The rocker arm 44 is connected to its key 4 at one end and to an interlocking rod 46 at the other end. Connected to each of these interlocking rods 46 is an interlocking wedge 47. For each row of keys such as is shown in Fig. 1 an interlocking channel 48 is provided. This interlocking channel extends parallel to the row of keys that is interlocked therein. At suitable intervals this interlocking channel is pierced with holes 49 with which the grouping pins 50 engage. Supported in the interlocking channels are the interlocking blocks 51. One or more of these interlocking blocks is placed between consecutive interlocking wedges. As will be noticed in Fig. 8 this interlocking wedge comprises the thin part that normally lies between consecutive interlocking blocks when its key is in unvoted position and a thick part which can be raised between the consecutive interlocking blocks when its key is placed in voted position.

The space between consecutive grouping pins is occupied by the interlocking blocks and the thin parts of the interlocking wedges leaving sufficient unoccupied space in the interlocking channel to permit of the insertion therein of the thick part of one or more interlocking wedges as the needs of the ticket on the machine may require. It will be understood, of course, that the arrangement of the grouping pins and interlocking blocks may be varied as the needs of the ticket in different elections may require.

It will be noted that the grouping pins 50 do not pass through the interlocking blocks 51 but through the channel immediately below the interlocking blocks so that the end wedges of each group contact with said interlocking pins and are limited in their lateral movement thereby. As the spread of the wedges is thus limited by the grouping pins the number of wedges that can be voted in each group is limited as well for it is obvious that an excess number of wedges can not be voted without spreading the end wedges of the group beyond the limit set by the grouping pins. I may also perforate that part of the interlocking channel that carries the interlocking blocks so that the grouping pins can be inserted between the blocks.

Figure 6:
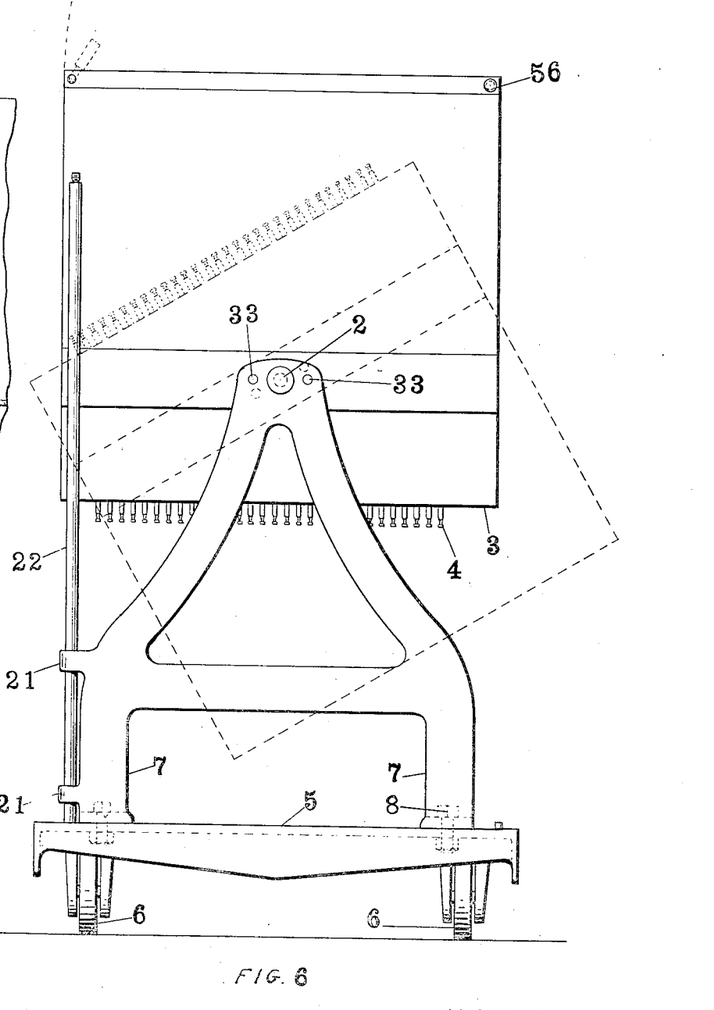
Fig. 6 is a side elevation of the machine showing the machine in inverted position.
Figure 7:
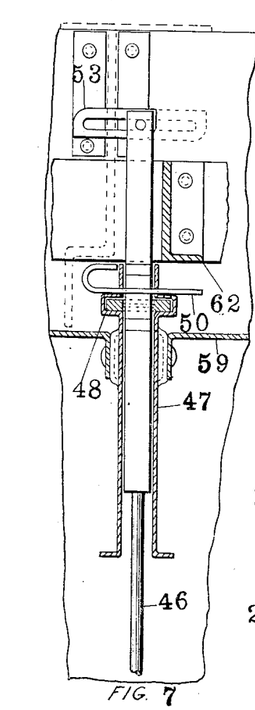
Fig. 7 is a detail of the interlocking wedge, its channel and lockout inverted or as it will appear when the machine is in the position shown in Fig. 6.

Each of the interlocking wedges 47 is slotted at the bottom and carries therein a pin 52. Pivoted on this pin is a dog 53. This dog has therein a slot 54 which engages with the said pin 52. This dog can be moved to the right on the pin 52, from the position shown in full lines in Fig. 17, and at the end of its movement it can be turned down to the position shown in dotted lines. To prevent the dog from being turned down while it is in the full line position, the dog is provided with a square shoulder while at the diagonally opposite corner the dog is square shouldered to hold it from swinging clockwise around pivot 52 from the dotted line position. The intermediate corner is rounded so that when the dog is moved to the left in Fig. 17 it may be swung down into dotted line position. The dogs 53 are held to the position shown in full or dotted lines in Fig. 17 by the plate 55 and until the plate 55 is removed the dogs must remain in the position in which they have been placed. To permit the ready adjustment of the dogs 53, I provide for the removal of the plates 55 in the following manner:—The bottom of the machine consists of a plate 56 which is pivoted at one side as shown at 57. When the machine is inverted as shown in Fig. 6 this bottom may be swung back out of the position shown in Fig. 17 and the plates 55 may then be removed. These plates are held in position between the brackets 58—58 mounted on the sides of the casing between which grooves are formed sufficient to engage the plate 55 and hold it in its lateral movement. The plate 55 is held against edgewise movement by the bottom 56 below and by the plate or brace 59 above. As is apparent in Fig. 17 these plates 55 hold not only the dogs 53 in position but also the grouping pins 50 so that the arrangement of the dogs and the grouping pins cannot be disturbed as long as the plates 55 remain in position and these plates are held in position between the bottom 56 and the braces 59 in the manner above described. The braces 59 are more fully illustrated in Fig. 13. As shown in that figure the interlocking channels 48—48 extend from one end of the machine to the other. These interlocking channels are parallel to each other and the space between consecutive interlocking channels is filled in by the plates 59 which plates are riveted to the adjacent channels and brace them against spreading or lateral movement. The outside braces are connected to the sides of the machine so that great rigidity is thereby imparted to the interlocking channels.

Figures 16, 17:
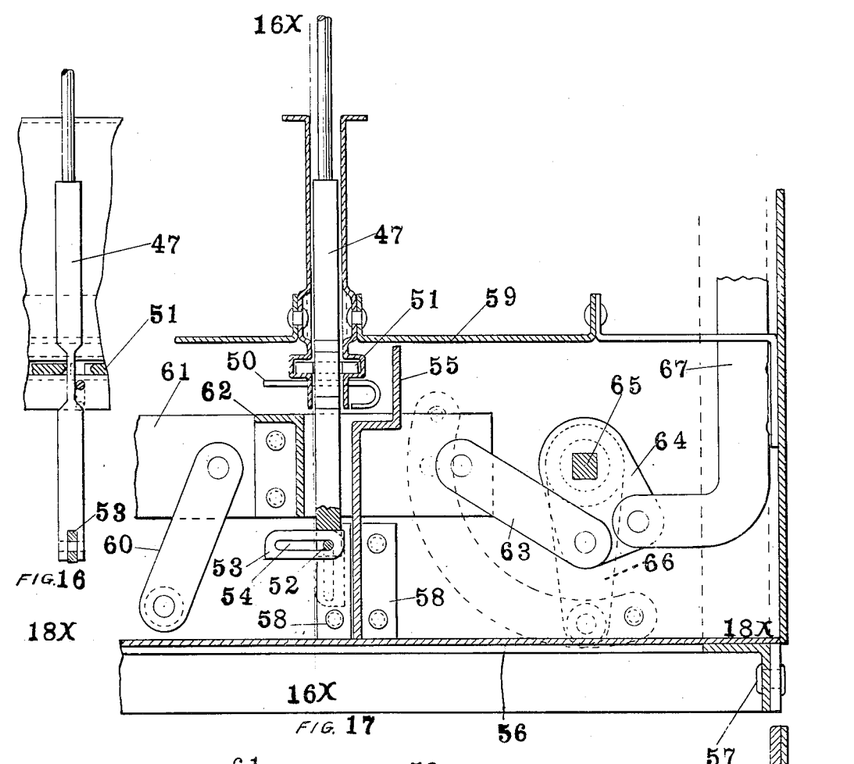
Fig. 16 is a section on the line 16×—16× of Fig. 17, showing the interlocking wedge and the channel.
Fig. 17 is a section on the line 17×—17× of Fig. 18 showing the interlocking mechanism and the class lockout.
Figure 18:
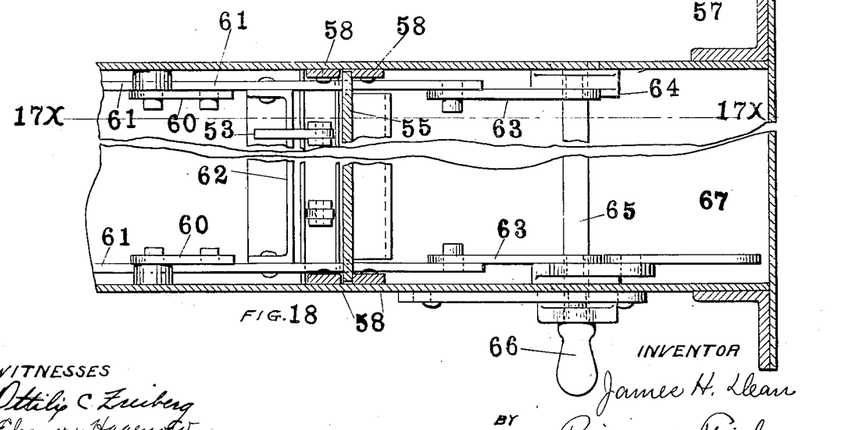
Fig. 18 is a section on the line 18×—18× of Fig. 17, looking in the direction of the arrows.

To lock selected keys against operation the dogs 53 may be used in the manner that I am now about to describe:—Mounted on the links 60 in the bottom of the machine are the bars 61—61, one at each end of the machine. Riveted to these bars 61 and extending parallel to the rows of interlocking rods are the angle bars 62. By moving these bars 61 to the right from the position shown in Fig. 13 the angle bars 62 may be positioned above the dogs 53 that stand at right angles to the interlocking rods 47 so that said dogs and rods will be held from upward movement. The bars 61 with an angle bar 62 in position for locking the dogs 53 is shown in Figs. 17 and 18. The movement of these locking bars to and from locking position is secured as follows:—Pivoted to the end of the bar 61 as shown in Fig. 13 is a link 63 which in turn is connected to the crank 64 keyed to the shaft 65. Mounted on this shaft 65 is the handle 66 shown in dotted lines in Fig. 17 and in full lines in Fig. 18. This handle is also shown at the lower left hand corner in Fig. 5 in which figure it is shown in full lines in position to lock the predetermined keys against operation; that is, it is set to hold the locking bars in the locking position as shown in Fig. 17.

To compel the setting of the handle 66 in either the class or regular position before the voting operation of the machine is begun and to hold it in such position during the voting operation of the machine, I provide the following mechanism: Pivoted to the crank 64 is the link 67 which is moved down and up as the crank 64 is moved to and beyond the center. Connected to the other end of the link 67 is the dog 68 pivoted on the stud 69 mounted on the end of the machine as shown in Fig. 5. When this dog 68 is held in the horizontal position shown in Fig. 5 the block 32 is free to move back and forth when operated by the handle 23. while the block 32 is in the position shown in Fig. 5 the dog 68 is held against oscillation. The block is in the position shown in Fig. 5 when the machine is unlocked for voting operation. When the block 32 is moved to the other end of its movement the machine is locked against voting operation. The block is moved to lock the machine against operation by the operation of the lever 23. When the block 32 is moved to the right the dog 68 is free to oscillate. When the lever 66 is moved through 90° the shaft 65 is rocked far enough to throw the locking bars 62 away from the dogs 53 and in so doing the dog 68 is oscillated from and to the position shown in Fig. 5. The link 67 in the meantime travels down and up and causes the oscillation of the dog 68. The limit of its travel is marked by the length of the segmental slot 70 shown in Fig. 13. When the connection between the link 67 and the dog 68 is drawn to the bottom of the slot 70 the block 32 must have been moved to the right from the position shown in Fig. 5 to permit the right hand end of the dog 68 to rise, and while the right hand end of the dog is up the block 32 is locked against movement to the left to the position shown in Fig. 5. While the dog is out of the position shown in Fig. 5 the machine is locked against operation. In this way the operation of the machine is prevented until the handle 66 has been placed in the one or the other of the extreme limits of its movement.

Figures 9, 10:
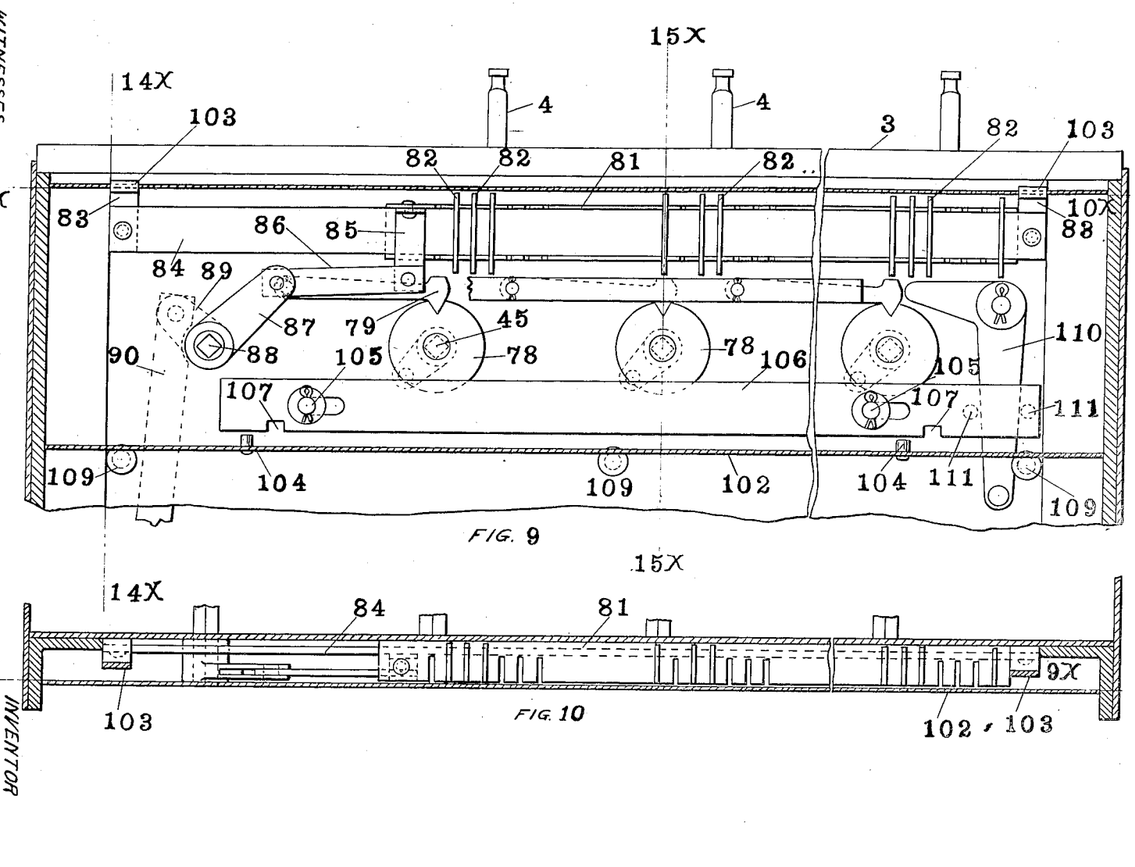
Fig. 9 is a section on the line 9×—9× of Fig. 10 showing the primary lockout.
Fig. 10 is a section on the line 10×—10× of Fig. 9.
Figures 11, 12:
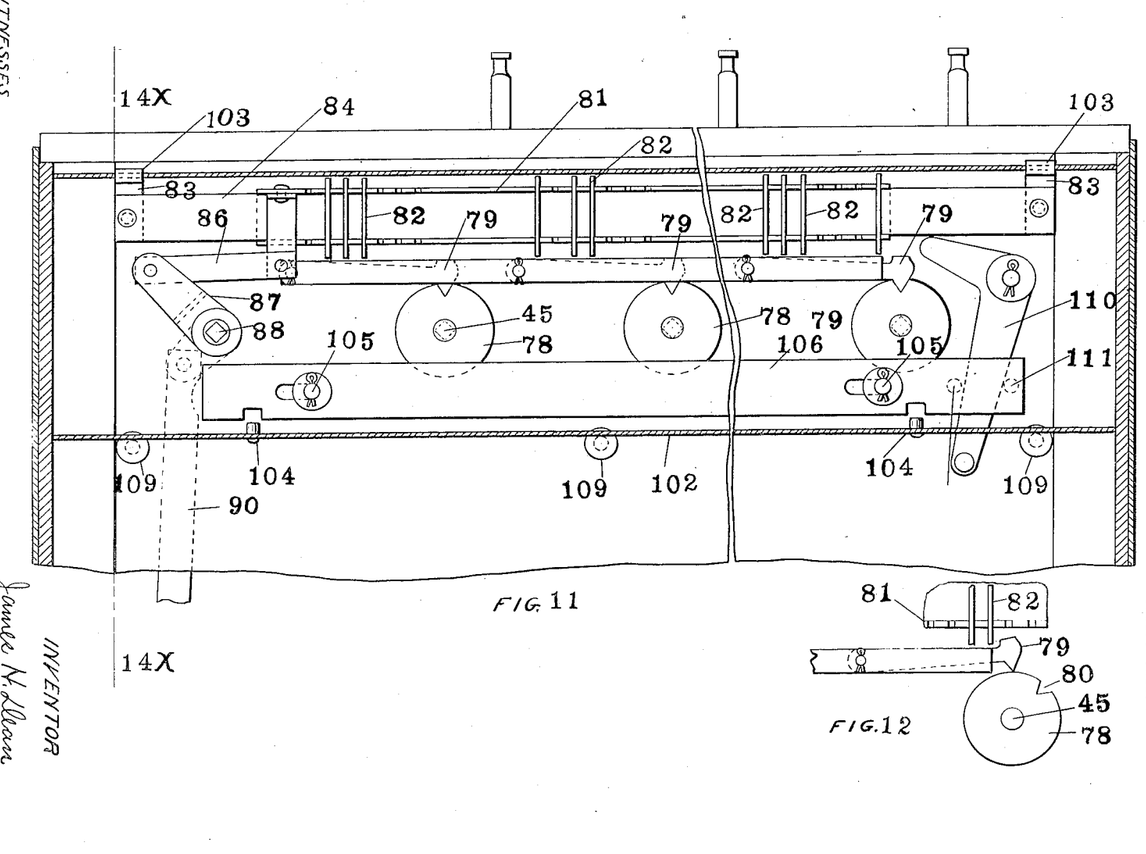
Fig. 11 is a section on the line 9×—9× of Fig. 10 being the same as Fig. 9 except that the parts are shown in a different position.
Fig. 12 is a detail of a portion of the primary lockout mechanism.

I also provide mechanism whereby the machine may be used in primary elections where the candidates of several different parties are voted on in the same election and each voter may be restricted to the candidates of his particular party so that he may vote for his choice among such candidates and is prevented from voting for any candidates of other political parties. The mechanism by which this result is secured I am now about to describe:—As described in my previous applications the rocker arms 44 are mounted to rotate around a square shaft 45. Between the rocker arms and the shaft that passes through them are placed on the shaft hubs 75, each of said hubs having the lug 76 therein capable of engaging the shoulders 77 on the rocker arm. The hubs 75 have squared axial openings fitting the shaft 45 so as to oscillate therewith. The rocker arms 44 however, are free to oscillate on the hub 75 except as otherwise prevented by the lugs 76. Between the lugs 76 and the shoulders 77 a limited lost movement is allowed to the rocker arm 44. When the key 4 is depressed its rocker arm 44 is oscillated with it, this rocker arm with its shoulder 77 engages with the lug 76 on the hub 75 and causes the rocking of the shaft 45. The shaft is rocked to the extent that it will carry all of the lugs 76 engaged therewith into contact with the other shoulders 77 of the rocker arms 44 of the keys that have not been voted but will not cause any voting movement of the keys. It will be seen that if the shaft 45 is held against oscillation the lugs 76 shown in Fig. 13 will hold all the keys of such shaft against operation as well. I secure this locking of the shafts and their keys against operation as follows: The shafts 45 are extended out to the end of the casing and each of them carries on the end thereof a disk 78 which disk is keyed to and oscillates with the shaft. If the disk is locked against rotation the shaft is locked against rotation as well and with it all of the keys controlled thereby. Each of these disks can be held locked against operation in position to hold all of the keys controlled by its shaft locked in unvoted position. The mechanism by which this result is secured I am now about to describe:—As shown in Figs. 11 and 12 and 13 each of these disks 78 has pivoted above it the locking dog 79. Each of these disks 78 has a recess 80 cut therein with which recess the locking dog 79 can engage to prevent the oscillation of the disk. When the locking dog 79 engages with this recess and is held positively in engagement therewith the oscillation of the disk 78 is prevented and this in turn will hold all of the keys controlled by the shaft 45 affected thereby locked in unvoted position. These dogs 79 are held positively in engagement with the disk 78 by the following mechanism:—Mounted immediately above the disks 78 and their locking dogs is a frame or channel 81 free to move longitudinally. At intervals occurring immediately above each of the locking disks the frame is recessed with a plurality of recesses. A group of these recesses occurs above each of these locking disks. Each of these recesses is capable of holding a locking dog 82, which when said dog is positioned above the pivoted dog 79, will hold said dog positively in engagement with the disk 78 and prevent it from rising therefrom, thus holding the disk against rotation. As shown in Figs. 9, 10 and 11 the frame is recessed so that seven of these dogs may be placed in locking position relative to each of the disks 78. Any one or more of these dogs 82 may be omitted from the frame 81 so that the locking dogs 79 may be released accordingly, when the blank space in the frame occasioned by the omission of the dog 82 is positioned above the dog 79. These blank spaces or the dogs 82 may be positioned successively over the dogs 79 by sliding the frame 81 and to shift the frame 81 to secure the locking or releasing of the shafts 45 and the keys of their party rows I provide the following mechanism: Mounted on the casing of the machine are the brackets 83—83 on which in turn is mounted the guide 84. This guide carries the frame 81 which is mounted to slide longitudinally thereon, the frame being shown at the right hand end of its movement in Fig. 9 and at the left hand end of its movement in Fig. 11. Riveted to the frame 81 is the bracket 85 to the lower end of which is connected the link 86 which in turn is pivoted to the crank 87 keyed on the shaft 88. To the opposite end of the shaft 88 is keyed the crank 89 to which in turn is connected the link 90. This link 90 in turn is connected to the plate 91 which is keyed to the shaft 92 and oscillates therewith as it is moved by the lever 93, which lever is shown at the right in Fig. 5.

As the lever 93 is oscillated the frame 81 is shifted longitudinally so as to bring predetermined dogs 82 into engagement with the dogs 79 and thereby lock the shafts 45 and their keys 4 against operation. It will be understood, of course, that when the lever 93 is in the position indicated by the word "Republican" in Fig. 5 the frame 81 will be in a certain position in which position no locking dog 82 will be presented to the dog or dogs 79 controlling the operation of the keys belonging to the candidates of the Republican party, while locking dogs 82 will be presented to the dogs 79 controlling the keys of all other parties, locking them against operation. When the lever 93 is moved to the position indicated by the word "Democrat" in Fig. 5 locking dogs 82 will be presented to the dogs 79 controlling the keys of the candidates of the Republican party and other parties but no locking dog or dogs will be presented to the dog or dogs 79 controlling the keys of the candidates of the Democratic party. In the same manner the keys for other parties will be released or controlled. It will be understood, of course, that the dogs 82 will be arranged in advance so that the keys of the candidates of but one party will be released at a time, keeping the keys belonging to the candidates of the other parties locked and by the progressive movement of the frame 81 the keys belonging to the candidates of each party will be unlocked in turn, such keys being the only ones unlocked at that setting of the machine. It will be understood too that each shaft 45 will be restricted to the keys of the candidates of a single party, that while one, two or more rows of keys may be given to one party all of which will be simultaneously locked or unlocked in no case will the keys of one row be divided among the candidates of two or more parties because of the difficulty caused thereby of keeping all but the keys of one party locked at a time, or because of the difficulty of releasing all the keys of one party at a time occasioned thereby. By duplicating the class lockout mechanism and by placing two dogs 53 on each interlocking wedge, the machine could be adapted to a primary election in which the candidates of two parties were placed on a single party row so that either set of such candidates could be locked or released at a time.

The plate 91 is provided with teeth 95 which are engaged by a tooth 96 on the sliding bar 97. The bar 97 is reciprocated by a mechanism operated by the operating lever 23 of the machine as follows:—As shown in Fig. 13 the lever 23 is keyed to the shaft 24. The lever 23 is provided with a cam 98. Pivotally mounted on the end plate of the machine is the rocking plate 99, having a roller 100 bearing against the cam 98 against which it is held firmly in engagement by the tension spring 101. When the operating lever 23 is thrown to the left from the position shown in Fig. 13, the cam 98 permits the spring 101 to draw the rocking plate 99 to the right at the bottom drawing the bar 97 with its tooth 96 out of engagement with the toothplate 91, permitting the resetting of the frame 81 by the lever 93. The frame 81 must be properly positioned so as to bring the dogs 82 immediately opposite the dogs 79 otherwise the tooth 96 on the bar 97 will not enter between the teeth 95 on the plate 91 and the operating lever 23 will thereby be locked against movement. If the parts are properly positioned as aforementioned the operating lever 23 can be oscillated without interference from the bar 97 and the rocking plate 99.

The dogs 82 may be re-arranged to meet the requirements of successive primary elections and access to such dogs is had by removing the cover plate 102 shown in Figs. 14 and 15. This cover plate while in position holds the dogs 82 securely in place. This cover plate 102 is held in position at the top by engagement with the stud 103 for which purpose the cover plate is suitably perforated. The studs 103 are part of the brackets 83, the brackets being bent out and up to form the studs 103 at the top thereof. The cover plate 102 is held in position at the bottom as follows:—Mounted on the casing of the machine are the studs 109 having large heads. The cover plate 102 is suitably recessed to engage with these studs so that by placing the plate 102 in suitable position and lowering it, it will engage with the studs 103 at the top and 109 at the bottom and will be held positively in position.

To lock the cover plate against removal I provide as follows: Mounted on the bottom of the cover plate on the inside are the studs 104, said studs being integral with the cover plate. Mounted on the machine casing are the studs 105. Mounted to slide on these studs is the bar 106. Cut in the bottom of this bar are the recesses 107. The bar 106 is mounted immediately over the studs 104 and the recesses 107 are the same distances between centers as are the studs 104. When the bar 106 is in the position shown in Fig. 11 the cover can be raised from the position shown in Figs. 9, 11 and 15. This will disengage the cover from the studs 103 at the top and the studs 109 at the bottom. The bar 106 must be in the position shown in Fig. 11 to permit the cover plate 102 to engage with and disengage from the studs 103 and 109. When the bar 106 is in the position shown in Fig. 9 the cover plate 102 is locked against rising, thus preventing the removal of it from the machine. The bar 106 can be shifted from the position shown in Fig. 9 to the position shown in Fig. 11 and back again by the bell crank lever 110 the long arm of which bell crank projects down through the cover plate 102 which cover plate is suitably recessed to provide therefor.

As shown in Fig. 9 the bell crank 110 is locked against oscillation by the dogs 82. When the frame 81 is moved to the left to the position shown in Fig. 11 the dogs 82 are carried beyond the short arm of the bell crank permitting the oscillation of the bell crank 110 and with it the bar 106. As shown in Figs. 9 and 11 the bar 106 is provided with two short studs 111 between which the long arm of the bell crank 110 is embraced.

While the frame 81 is in the position shown in Fig. 11 it is obvious that all of the dogs 79 are free to be raised simultaneously irrespective of the arrangement of the locking dogs 82 so that by merely shifting frame 81 to the position shown in Fig. 11 all of the rows of keys are released for simultaneous operation permitting the use of the machine at general elections. In this way my machine is readily interchanged from primary to general elections.

Having thus described my invention, what I claim as new and patentable is as follows:

1. The combination in a voting machine of keys arranged in a series of parallel rows, interlocking mechanism for said keys comprising an interlocking wedge connected to each key and operated thereby, interlocking channels extending parallel to said rows of keys, interlocking blocks mounted to slide in said channels, and grouping pins passing through said channels independent of and out of line with the interlocking blocks.

2. The combination in a voting machine of an interlocking channel bar, interlocking blocks mounted therein, perforations through said interlocking channel bar, and grouping pins passing through said perforations and engaging with the interlocking wedges and avoiding the interlocking blocks.

3. The combination in a voting machine of an interlocking channel bar, interlocking wedges extending through said channel bar, interlocking blocks carried by said channel bar and adapted to be engaged by said wedges, perforations in said channel bar, the number thereof being at least equal to the interlocking wedges contained therein, and grouping pins passing through said interlocking channel and mounted to engage with the interlocking wedges.

4. The combination in a voting machine of an interlocking channel bar, interlocking wedges extending through said channel bar, interlocking blocks carried by said channel bar and adapted to be engaged by said wedges, perforations in said channel bar, the number thereof being at least equal to the interlocking wedges contained therein, and grouping pins passing through said interlocking channel bar and mounted to engage with the interlocking wedges and avoid the interlocking blocks.

5. The combination in a voting machine of keys arranged in rows, a separate locking bar controlling the keys of each row, said bar being movable to lock or unlock said keys, a common locking and unlocking device for said bars, said device being movable to successive positions, and adjustable locking devices thereon for the purpose of locking or unlocking said locking bars in any of said positions.

6. The combination in a voting machine of a plurality of keys arranged in rows, a locking bar for each row of keys, a common locking device for controlling all of said bars, said locking device being movable to a plurality of successive positions, and a plurality of locking dogs on said common means for each of said locking bars, each of said dogs being capable of locking its bar in turn, said dogs being adjustable to lock or release their particular bars in successive positions.

7. The combination in a voting machine of keys arranged in a plurality of rows, a locking bar for each of said rows of keys, a dog for each of said locking bars to prevent the operation thereof, and means for holding such dogs against movement, thereby holding said bars locked.

8. The combination in a voting machine of voting keys arranged in a plurality of rows, a locking bar for each of said rows of keys, and a plurality of means independent of the bars for holding each of said locking bars against operation.

9. The combination in a voting machine of voting keys arranged in a plurality of rows, an oscillating bar for locking each of said rows of keys, and a plurality of means for locking each of said locking bars against rotation.

10. The combination in a voting machine of voting keys arranged in a plurality of rows, a locking bar for each of said rows of keys, each of said bars having a recess at its end, a dog for engaging said recess to prevent the movement of said bar, and means for holding said dog against movement.

11. The combination in a voting machine of voting keys arranged in a plurality of rows, a locking bar for each row having a recess at the end, a dog for engaging with said recess to hold the bar against movement, and a frame carrying a plurality of dogs for engaging successively with said first mentioned dog to hold said dog and the bar against movement.

12. The combination in a voting machine of voting keys arranged in a plurality of rows, a locking bar for each row having a recess at the end, a dog for engaging with said recess to hold the bar against movement, and a frame carrying a plurality of dogs for engaging successively with said first mentioned dog to hold said dog and the bar against movement, each of said dogs being separately removable from said frame.

13. A lockout for a voting machine comprising a sliding channel bar having recesses cut therein and dogs placed in said recesses.

14. A lockout for a voting machine comprising a sliding channel bar having recesses cut therein in groups with a plurality of recesses in each group, and dogs engaging said recesses.

15. A lockout for a voting machine comprising a sliding bar having transverse recesses, dogs engaging said recesses, said recesses being arranged in a plurality of groups with a plurality of recesses in each group, said dogs being freely removable from said recesses.

16. A lockout for a voting machine comprising a sliding bar having transverse recesses, dogs engaging said recesses, said recesses being arranged in a plurality of groups with a plurality of recesses in each group, said dogs being freely removable from said recesses, and means for holding said dogs in any predetermined arrangement in said recesses.

17. The combination in a voting machine of a series of locking bars with a frame sliding across said locking bars and having a plurality of adjustable stops thereon for each of said locking bars, whereby the movement of each of said bars is controlled.

18. The combination in a voting machine of a plurality of locking bars, a frame movable transversely to said locking bars, a plurality of stops on said frame for each of said locking bars, said series of stops being arranged thereon the same distance between centers as the distance between centers of said locking bars.

19. The combination in a voting machine of a lockout comprising a frame, a series of stops detachably mounted thereon, and a removable cover plate for said lockout, said cover plate serving when in position to hold said stops in position on said frame.

20. The combination in a voting machine of a lockout comprising a frame, a series of stops detachably mounted thereon, and a removable cover plate for said lockout, said cover plate serving when in position to conceal said stops and when removed to expose and release said stops for adjustment.

21. The combination in a voting machine of a lockout comprising a frame, a series of stops detachably mounted thereon, and a removable cover plate for said lockout, said cover plate serving when in position to conceal said stops and when removed to expose and release said stops for adjustment, said cover plate being locked against removal except when said frame is in a predetermined position.

22. The combination in a voting machine of studs carried thereon, a cover plate movable laterally to engage with and disengage from said studs, a bar slidably mounted on the machine within said cover plate to hold said cover plate against lateral movement except when said bar is in a predetermined position, and means for moving said bar to and from said predetermined position.

23. The combination in a voting machine of studs carried thereon, a cover plate movable laterally to engage with and disengage from said studs, a bar slidably mounted on the machine within said cover plate to hold said cover plate against lateral movement except when said bar is in a predetermined position, and a lever for moving said bar to and from said position.

24. The combination in a voting machine of studs carried thereon, a cover plate movable laterally to engage with and disengage from said studs, a bar slidably mounted on the machine within said cover plate to hold said cover plate against lateral movement except when said bar is in a predetermined position, means for moving said bar to and from said predetermined position, a lever for moving said bar, and a lockout frame having stops thereon for preventing the movement of said lever except when said frame is in a predetermined position.

25. The combination in a voting machine of a lockout movable to successive positions, and means to center said lockout in each of said successive positions, said means obstructing the operation of the machine if the lockout is not properly centered in its position.

26. The combination in a voting machine of a lockout, a handle for operating said lockout, a recessed sector attached to and operated by said handle, a slide with a tooth thereon for engaging any of said recesses, an operating lever for the machine, and means connected thereto for moving said tooth into one of said recesses upon the operation of said handle.

27. The combination in a voting machine of a voting device, a pin mounted thereon, a shoulder adjacent to said pin, a dog mounted to slide and turn on said pin, said dog having two angular corners and an intervening rounded corner, by means of which each of said dogs can be held positively in either of two positions.

28. The combination in a voting machine of a voting device, a pin mounted thereon, a shoulder adjacent to said pin, a dog mounted to slide and turn on said pin, said dog having two angular corners and an intervening rounded corner, by means of which each of said dogs can be held positively in either of two positions, and a lockout bar for engaging the dogs held in one of said positions.

29. The combination in a voting machine of a voting device, a pin mounted thereon, a shoulder adjacent to said pin, a dog mounted to slide and turn on said pin, said dog having two angular corners and an intervening rounded corner, by means of which each of said dogs can be held positively in either of two positions, said voting devices being arranged in rows, and a lockout bar adjacent to each of said rows of voting devices, said bar being movable toward and away from said voting devices to engage with said dogs and lock said voting devices against operation, and means for moving said bars toward and away from said voting devices.

30. The combination in a voting machine of a voting device, a pin mounted thereon, a shoulder adjacent to said pin, a dog mounted to slide and turn on said pin, said dog having two angular corners and an intervening rounded corner, by means of which each of said dogs can be held positively in either of two positions, said voting devices being arranged in a plurality of parallel rows, a bar for each of said rows of voting devices, capable of engaging in one position the voting devices whose dogs have been placed in one of said positions, and means for moving said bars simultaneously to engage with or disengage from said voting devices.

31. The combination in a voting machine of keys arranged in rows, a longitudinally movable device common to said rows and having adjustable devices thereon and intermediate connections whereby said devices may be progressively moved to release the keys of one party and lock the rest.

32. The combination in a voting machine of voting devices arranged in rows, a pivoted dog on each of said voting devices, said dogs being adjustable to either of two positions thereon, and a stationary bar extending parallel to said voting devices which prevents the movement of said dogs from the one position to the other.

33. The combination in a voting machine of voting devices arranged in rows, a dog pivoted on each of said voting devices and extending at right angles therefrom, a lockout bar for each of said rows of voting devices and extending parallel thereto, a frame for supporting and carrying said lockout bars, means for moving said frame to position said bars in either locking or unlocking position.

34. The combination in a voting machine of voting devices arranged in rows, a dog pivoted on each of said voting devices and extending at right angles therefrom, a lockout bar for each of said rows of voting devices and extending parallel thereto, a frame for supporting and carrying said lockout bars means for moving said frame to position said bars in either locking or unlocking position, means for operating the voting machine, and means to prevent the shifting of the lockout means except when said operating means is in a predetermined position.

35. A voting machine, means for operating said machine, party voting devices thereon, means for locking out said voting devices for one or more of said parties, said means being movable to and from locking position, and means to prevent the movement of said party lockout means except when the operating means for the voting machine is in a predetermined position.

36. The combination in a voting machine of a casing, interlocking channel members mounted therein extending parallel to each other, plates mounted between adjacent channel members and connected thereto, and plates extending between the outermost channel members and the casing.

37. The combination in a voting machine of a casing, brackets mounted on the side of said casing, plates slidably mounted in said brackets and a hinged bottom to said casing which when open permits the insertion or removal of said plates, and which when in closed position holds said plates locked against movement.

38. The combination in a voting machine of a casing, brackets mounted on the side of said casing, plates slidably mounted in said brackets, and a hinged bottom to said casing which when open permits the insertion or removal of said plates, and which when in closed position holds said plates locked against movement, rows of voting devices arranged adjacent to said plates, and dogs and grouping pins adjustably associated with said voting devices, said dogs and grouping pins being held in position by said plates.

39. In a voting machine, the combination of keys, a main operating mechanism, means for holding any desired keys against actuation, and means preventing actuation of the main operating mechanism if the holding means is improperly set.

40. In a voting machine, the combination of keys, a main operating mechanism, means for holding any desired keys against actuation, and means preventing actuation of the main operating mechanism if the holding means is improperly set and retaining the holding means in set position during the operation of the main operating mechanism.

41. In a voting machine, a plurality of key members, main operating mechanism, means effective to hold a number of said key members against operation, means effective to hold certain of the remaining key members against operation, and means preventing operation of said main operating mechanism from the key members not held except when said holding means are in predetermined positions.

42. In a voting machine, a plurality of key members, main operating mechanism, means effective to hold a number of said key members against operation, means effective to hold certain of the remaining key members against operation, and means connecting each of said holding means with the main operating mechanism when either of the holding means is not properly set and to retain each of the holding means against actuation during the operation of the main mechanism.

JAMES H. DEAN.

Witnesses:
 HARRY L. CLAPP,
 KATHARINE GERLACH.